United States Patent
Tada

(10) Patent No.: US 8,011,254 B2
(45) Date of Patent: Sep. 6, 2011

(54) APPARATUS FOR AND METHOD OF MEASURING MOTION CHARACTERISTICS OF HEAD GIMBAL ASSEMBLY

(75) Inventor: Hajime Tada, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 240 days.

(21) Appl. No.: 12/583,791

(22) Filed: Aug. 26, 2009

(65) Prior Publication Data

US 2010/0053792 A1 Mar. 4, 2010

(30) Foreign Application Priority Data

Aug. 29, 2008 (JP) .............................. P2008-222264

(51) Int. Cl.
*G01L 3/00* (2006.01)
*G01L 5/24* (2006.01)
(52) U.S. Cl. ............. 73/862.23; 73/862.08; 73/862.191; 360/31
(58) Field of Classification Search ............... 73/862.08, 73/862.191, 862.23; 360/31
See application file for complete search history.

(56) References Cited

U.S. PATENT DOCUMENTS

| 7,506,552 | B2* | 3/2009 | Hernandez et al. | 73/862.191 |
| 7,520,168 | B2* | 4/2009 | Obergfell et al. | 73/430 |
| 2006/0092548 | A1* | 5/2006 | Mihara et al. | 360/75 |
| 2006/0103382 | A1* | 5/2006 | Mihara et al. | 324/262 |
| 2008/0060445 | A1* | 3/2008 | Obergfell et al. | 73/856 |
| 2008/0186633 | A1* | 8/2008 | Hernandez et al. | 360/290 |

FOREIGN PATENT DOCUMENTS

| JP | 11-096527 | 4/1999 |
| JP | 2006-244582 | 9/2006 |

* cited by examiner

*Primary Examiner* — Lisa Caputo
*Assistant Examiner* — Jonathan Dunlap
(74) *Attorney, Agent, or Firm* — Jordan and Hamburg LLP

(57) ABSTRACT

An apparatus correctly measures motion characteristics a head gimbal assembly exhibits when turned in a radial direction of a hard disk. The apparatus includes an assembly support to fixedly support the head gimbal assembly on a center axis that corresponds to a rotation axis around which the head gimbal assembly is turned in actual use, a disk drive to rotatably support the hard disk and turn around a turn axis that is concentric with the center axis on which the head gimbal assembly is fixedly supported, and a turn unit to turn the disk drive around the turn axis, thereby creating a relative turn of the head gimbal assembly with respect to the hard disk.

10 Claims, 6 Drawing Sheets

Head suspension is defocused and unobservable.

Head suspension is focused and observable.

Head suspension is defocused and unobservable.

Head suspension is defocused and unobservable.

APPARATUS FOR AND METHOD OF MEASURING MOTION CHARACTERISTICS OF HEAD GIMBAL ASSEMBLY

BACKGROUND OF THE INVENTION

1. Field of the Invention

The present invention relates to an apparatus for and a method of measuring motion characteristics of a head gimbal assembly incorporated in a hard disk drive (HDD) of an information processing unit such as a computer.

2. Description of Related Art

A hard disk drive includes a hard disk and a head gimbal assembly including a head suspension, a flexure, a slider and the like. When the hard disk is rotated at high speed, the slider of the head gimbal assembly slightly floats from the surface of the hard disk and a transducer incorporated in the slider writes and reads data to and from the hard disk.

The hard disk drive usually employs a load/unload mechanism to load the slider onto tracks of the hard disk when the hard disk is rotated and unload the slider out of the tracks when the hard disk is stopped.

The load/unload mechanism employs a ramp block made of resin and arranged in the vicinity of the periphery of the hard disk. When the hard disk is stopped, the head gimbal assembly is retracted onto the ramp block. At this time, a tab formed on a front end of the head suspension of the head gimbal assembly is guided along a slope of the ramp block, to move the slider away from the hard disk and prevent the slider from contacting the hard disk during the stoppage of the hard disk.

When the tab is guided along the slope of the ramp block, friction between the tab and the ramp block may grind the ramp block to produce fine matter that may badly affect the hard disk. The hard disk is also vulnerable to unexpected behavior of the slider that may occur during the load/unload movement.

The head gimbal assembly is driven by a voice coil motor (VCM) when achieving the load/unload movement, or when moved from a track to another track on the hard disk, or when following a track on the hard disk. To correctly achieve these tasks, motion characteristics the head gimbal assembly exhibits during a turn thereof in a radial direction of the hard disk must be correctly measured and optimized.

For this, there is a need of an apparatus for easily measuring the motion characteristics of a head gimbal assembly.

Apparatuses for measuring the motion characteristics of a head gimbal assembly frequently employ high-speed cameras or laser Doppler velocimeters to observe the behavior of a slider of the head gimbal assembly during a load/unload motion or a track-to-track movement. This type of apparatus is disclosed in, for example, Japanese Unexamined Patent Application Publications No. H11-96527 and No. 2006-244582. These related arts are limited in the correctness of measured data because they obtain the data by turning a head gimbal assembly in a radial direction of a hard disk.

SUMMARY OF THE INVENTION

An object of the present invention is to provide an apparatus for and a method of measuring motion characteristics of a head gimbal assembly, capable of correctly obtaining data on the motion characteristics of the head gimbal assembly.

In order to accomplish the object, an aspect of the present invention provides an apparatus for measuring motion characteristics a head gimbal assembly exhibits when turned in a radial direction of a hard disk. The apparatus includes an assembly support configured to fixedly support the head gimbal assembly on a center axis that corresponds to a rotation axis around which the head gimbal assembly is turned in actual use; a disk drive configured to rotatably support the hard disk and turn around a turn axis that is concentric with the center axis on which the head gimbal assembly is fixedly supported; and a turn unit configured to turn the disk drive around the turn axis, thereby creating a relative turn of the head gimbal assembly with respect to the hard disk.

This aspect of the present invention obtains data on motion characteristics a head gimbal assembly exhibits when turned in a radial direction of a hard disk without turning the head gimbal assembly in the radial direction of the hard disk.

This aspect may employ a high-speed camera to photograph a slider area of the head gimbal assembly, to obtain data on motion characteristics of the head gimbal assembly. The aspect allows the camera to easily focus on the slider area and obtain correct data on movements of the slider.

BRIEF DESCRIPTION OF THE DRAWINGS

FIGS. 8A to 8H are views illustrating the related art of FIG. 7, in which FIGS. 8A, 8C, 8E, and 8G illustrate a head gimbal assembly observed according to the related art and FIGS. 8B, 8D, 8F, and 8H illustrate positions of the head gimbal assembly with respect to a hard disk and a ramp block in the situations of FIGS. 8A, 8C, 8E, and 8Q respectively;

FIGS. 9A and 9B are views illustrating the embodiment of the present invention, in which FIG. 9A illustrates a head gimbal assembly observed with the second high-speed camera of FIG. 4 and FIG. 9B illustrates the behavior of the head gimbal assembly according to the embodiment;

DETAILED DESCRIPTION OF EMBODIMENTS

An apparatus for measuring motion characteristics of a head gimbal assembly according to an embodiment of the present invention will be explained. The apparatus correctly obtains data on the motion characteristics of a head gimbal assembly by turning a disk drive around a center axis that corresponds to a rotation axis of the head gimbal assembly in actual use to create a relative turn of the head gimbal assembly with respect to a hard disk.

Figure 1:
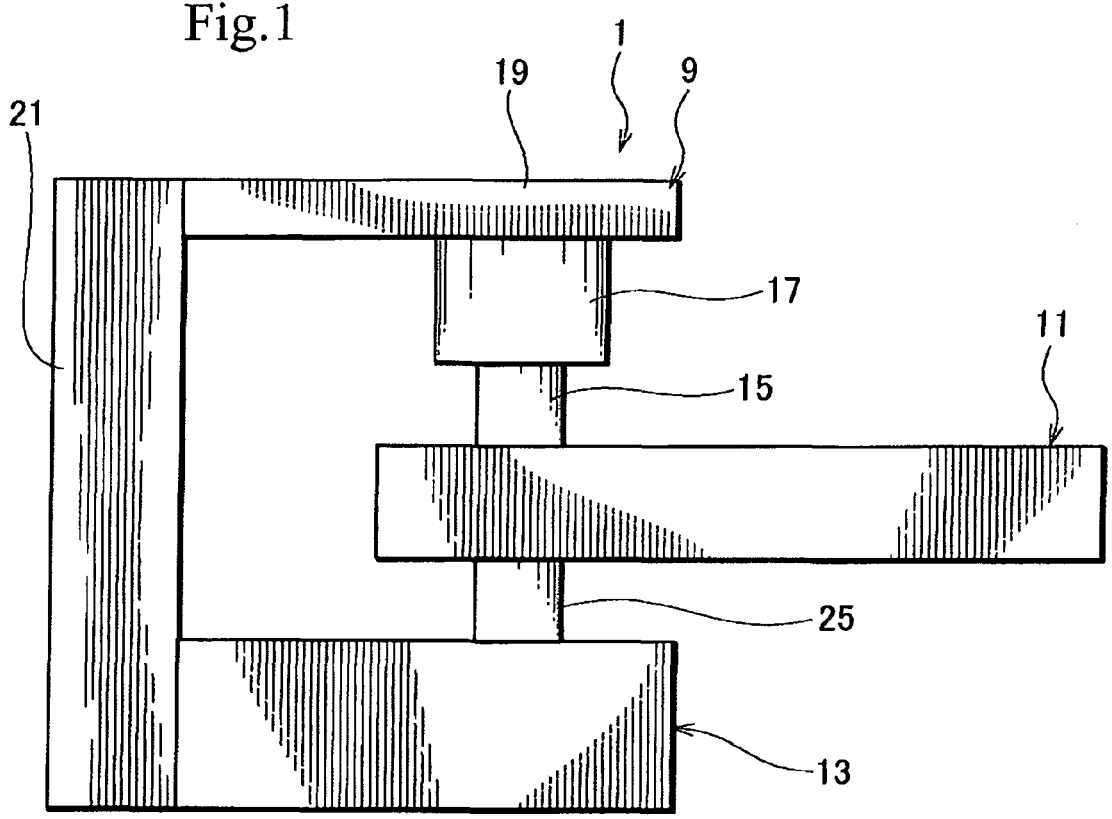
FIG. 1 is a block diagram illustrating an apparatus for measuring motion characteristics of a head gimbal assembly according to an embodiment of the present invention.
Figure 2:
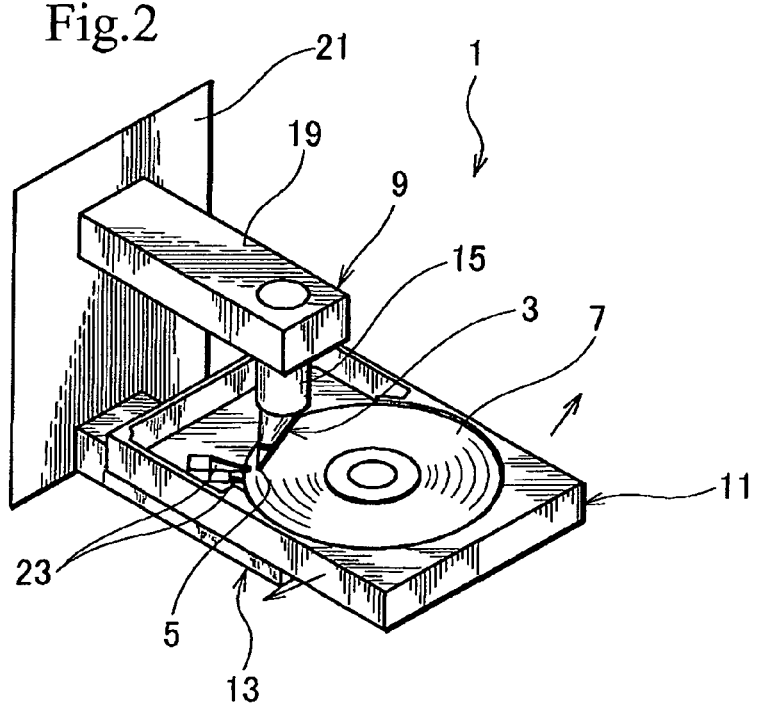
FIG. 2 is a perspective view illustrating the apparatus of FIG. 1.
Figure 3:
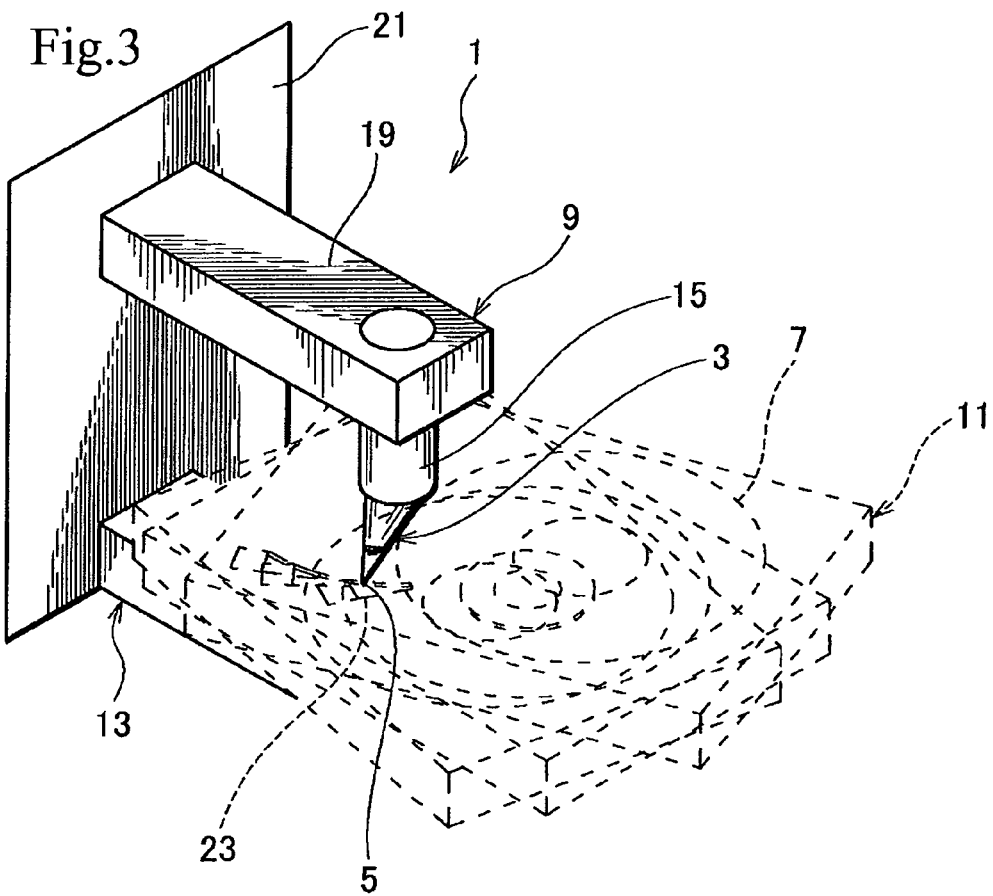
FIG. 3 is a perspective view illustrating turns of a disk drive carried out by the apparatus of FIG. 1.

FIG. 1 is a block diagram illustrating the apparatus for measuring the motion characteristics of a head gimbal assembly according to an embodiment of the present invention, FIG. 2 is a perspective view illustrating the apparatus, and FIG. 3 is a perspective view illustrating a turning operation of a disk drive carried out by the apparatus.

The apparatus 1 illustrated in FIG. 1 obtains data on motion characteristics a head gimbal assembly 3 exhibits when turned in a radial direction of a hard disk 7. The head gimbal assembly 3 includes a slider 5 that incorporates a transducer to write and read data to and from the hard disk 7 as well as a head suspension and the like.

The apparatus 1 has an assembly support 9, a disk drive 11, and a turn unit 13.

The assembly support 9 fixedly supports the head gimbal assembly 3 on a center axis that corresponds to a rotation axis around which the head gimbal assembly 3 is turned in actual use. The assembly support 9 includes an upper beam 19, a torquemeter 17, and a fixed shaft 15.

In an actual hard disk drive, the head gimbal assembly 3 is turned by, for example, a voice coil motor around a center axis of the voice coil motor. The center axis on which the assembly support 9 fixedly supports the head gimbal assembly 3 corresponds to the center axis of the voice coil motor.

In FIG. 2, the head gimbal assembly 3 is fixed to the fixed shaft 15 of the assembly support 9. An axial center of the fixed shaft 15 is the center axis on which the assembly support 9 fixedly supports the head gimbal assembly 3 and corresponds to the center axis of the voice coil motor.

The fixed shaft 15 is joined with the torquemeter 17 of the assembly support 9. The torque meter 17 is a data monitor to measure torque around the center axis acting on the head gimbal assembly 3. The measured torque is data representative of the motion characteristics of the head gimbal assembly 3. Namely, the torquemeter 17 is a data monitor that gathers motion characteristic data acting on the fixed shaft 15 as torque acting around the center axis of the voice coil motor at the time of turning the head gimbal assembly 3 to load/unload the slider 5 to and from the hard disk 7 in actual use.

The torquemeter 17 is attached to the upper beam 19 extending from a base frame 21.

The disk drive 11 is configured like a hard disk drive, to support and drive the hard disk 7 with a motor. The disk drive 11 is supported to turn around a turn axis that is concentric with the axial center of the fixed shaft 15.

The disk drive 11 has a ramp block 23 made of synthetic resin. The ramp block 23 is positioned adjacent to the periphery of the hard disk 7, so that a tab 3a (FIG. 11) of the head gimbal assembly 3 formed in the vicinity of the slider 5 may run on the ramp block 23 and be guided along a slope of the ramp block 23 when the slider 5 is loaded and unloaded to and from the hard disk 7. The disk drive 11 may exclusively be prepared, or may be one actually used in a hard disk drive. In the latter case, a head gimbal assembly is removed from the hard disk drive and other parts of the hard disk drive including a hard disk, a driving system, and a ramp block are left as they are on the hard disk drive so that the hard disk drive is used as the disk drive 11.

The disk drive 11 is supported by a turn shaft 25 that is concentric with the fixed shaft 15 and is coupled with the turn unit 13 (FIG. 1).

The turn unit 13 drives the turn shaft 25 so that the disk drive 11 turns around the center of the turn shaft 25, i.e., the center of the fixed shaft 15 that corresponds to the rotation axis around which the head gimbal assembly 3 is turned in actual use. This operation creates a relative turn of the slider 5 of the head gimbal assembly 3 in a radial direction with respect to the hard disk 7. The turn unit 13 includes a motor, a reduction gear, and the like.

When the turn unit 13 turns or sways the disk drive 11 in directions indicated with arrows in FIG. 2, the disk drive 11 turns relative to the head gimbal assembly 3 that is stationary, as indicated with dotted lines in FIG. 3. This is equal to turning the slider 5 of the head gimbal assembly 3 in a radial direction of the hard disk 7.

At this time, the ramp block 23 located adjacent to the periphery of the hard disk 7 also turns relative to the slider 5 of the head gimbal assembly 3.

This allows a correct observation of the behavior the slider 5 exhibits when moved from the hard disk 7 onto the ramp block 23, or when moved from a track to another track on the hard disk 7, or when following a track on the hard disk 7.

In this way, the embodiment creates a turn of the slider 5, i.e., a turn of the head gimbal assembly 3 in a radial direction of the hard disk 7 by turning the hard disk 7 relative to the head gimbal assembly 3. With this, the embodiment correctly obtains data on motion characteristics the head gimbal assembly 3 exhibits when guided along the slope of the ramp block 23 or when moved in a radial direction of the hard disk 7.

The torquemeter 17 obtains torque acting on the head gimbal assembly 3 that is not turned, and therefore, the obtained torque is correct and is correctly usable as data to find a frictional force acting between the head gimbal assembly 3 and the ramp block 23, and the like as the motion characteristics of the head gimbal assembly 3.

Figure 4:
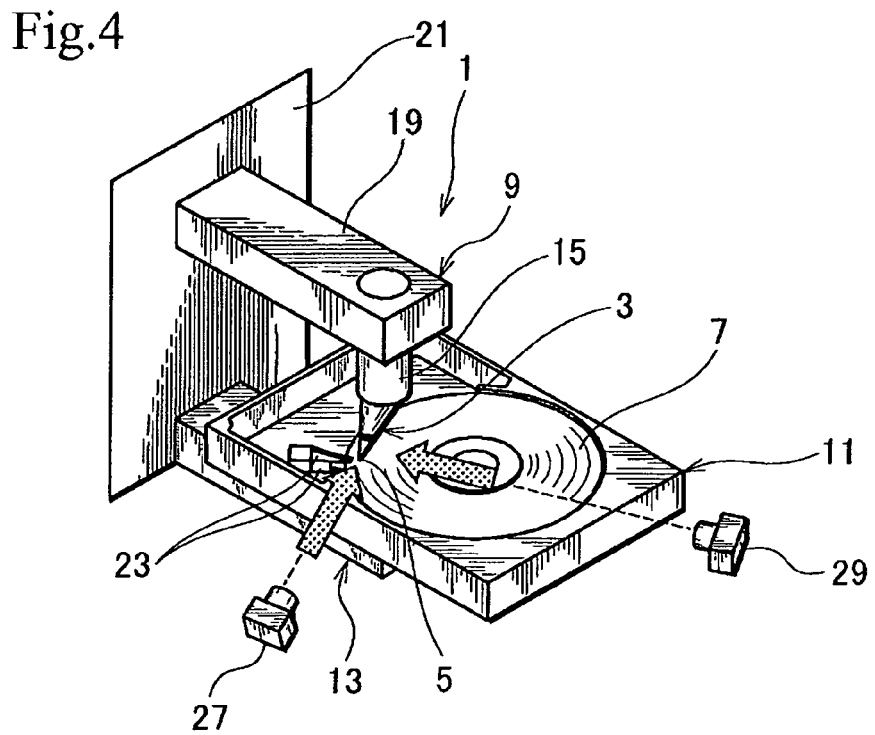
FIG. 4 is a perspective view illustrating the apparatus of FIG. 1 with first and second high-speed cameras.

FIG. 4 is a perspective view illustrating the apparatus 1 of FIG. 1 provided with first and second high-speed cameras 27 and 29 serving as data monitors.

The first camera 27 is arranged to observe a horizontal front view of the slider 5 area of the head gimbal assembly 3. The second camera 29 is arranged to observe a horizontal side view of the slider 5 area of the head gimbal assembly 3. The cameras 27 and 29 photograph the head gimbal assembly 3 in a direction orthogonal to the center axis on which the assembly support 9 fixedly supports the head gimbal assembly 3.

Figure 5A:
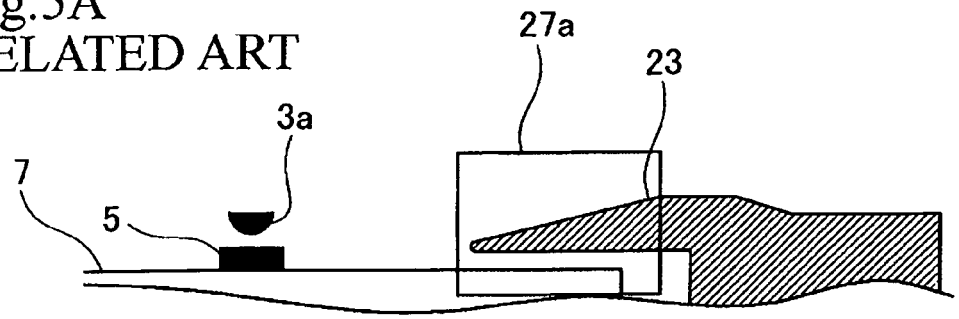
FIGS. 5A and 5B are views illustrating an observation area and movements of a head gimbal assembly with respect to the observation area according to a related art employing a first high-speed camera.
Figure 5B:
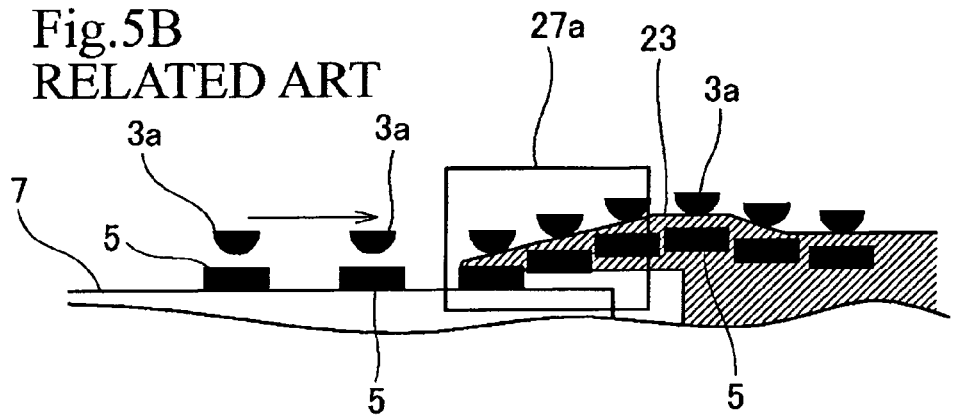
Figure 6:
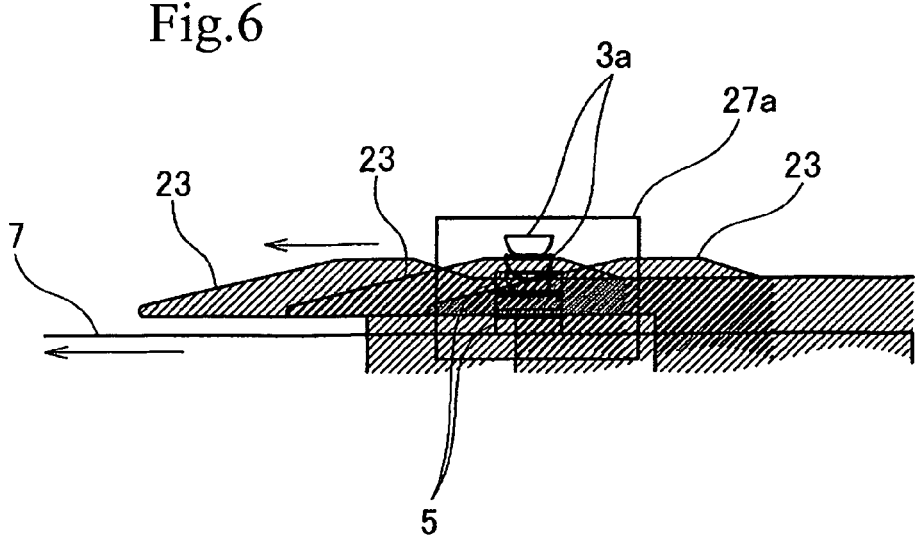
FIG. 6 is a view illustrating an observation area and movements of a head gimbal assembly in the observation area according to the embodiment of the present invention employing the first high-speed camera of FIG. 4.

FIGS. 5A, 5B, and 6 illustrate a relationship between the observation area of the first high-speed camera 27 and the movement of the head gimbal assembly 3, in which FIGS. 5A and 5B are of a related art employing the camera 27 to observe the head gimbal assembly 3 and FIG. 6 is of the embodiment of the present invention employing the camera 27 to observe the head gimbal assembly 3.

The related art of FIGS. 5A and 5B turns the head gimbal assembly 3 with a voice coil motor in a radial direction of the hard disk 7 and observes a horizontal front view of the slider 5 of the head gimbal assembly 3 with the camera 27.

According to the related art, the head gimbal assembly 3 is turned by the voice coil motor toward the observation area 27a of the camera 27 as illustrated in FIGS. 5A and 5B, and therefore, the slider 5 and tab 3a of the head gimbal assembly 3 horizontally move over the surface of the hard disk 7. Once the tab 3a is brought onto the ramp block 23, the slider 5 and tab 3a show horizontal and vertical movements. With respect to these movements, the observation area 27a of the camera 27 is stationary as illustrated in FIGS. 5A and 5B.

As a result, the first high-speed camera 27 usually employing a large magnification lens observes only part of the movements of the slider 5 and tab 3a of the head gimbal assembly 3 as illustrated in FIG. 5B. Namely, the related art is unable to wholly observe the movements of the head gimbal assembly 3.

On the other hand, the embodiment of the present invention illustrated in FIG. 6 does not turn the head gimbal assembly 3 and keeps the same in the observation area 27a of the first camera 27 during the relative turn, and therefore, easily and correctly obtains data about motion characteristics of the head gimbal assembly 3 for the whole turning motion thereof.

Figure 7:
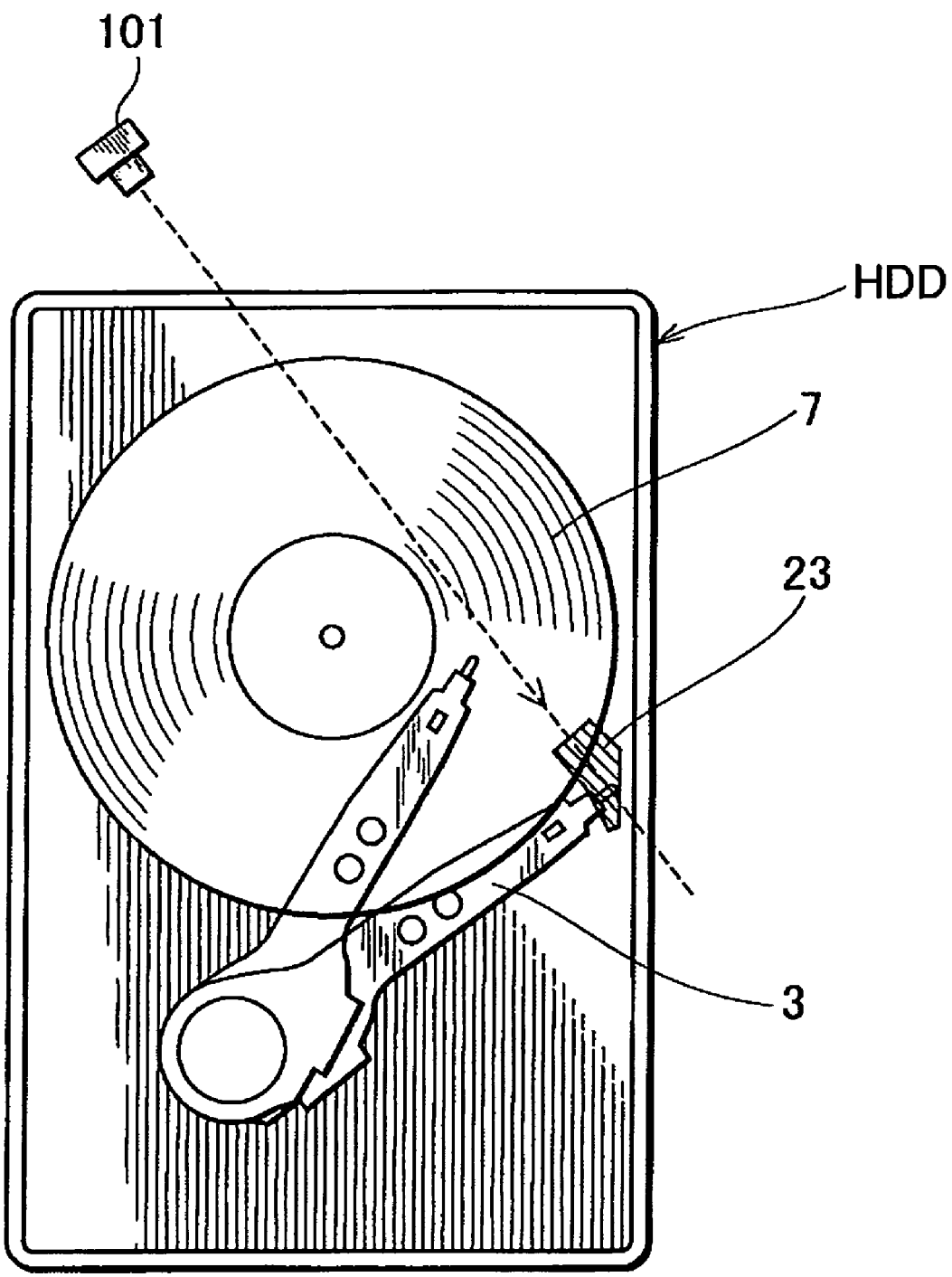
FIG. 7 is a plan view illustrating a related art employing a second high-speed camera.

FIG. 7 is a plan view illustrating a related art employing a second high-speed camera 101 (corresponding to the second high-speed camera 29 of FIG. 4) for measuring motion characteristics of a head gimbal assembly 3.

In FIG. 7, a hard disk drive has a ramp block 23 in the vicinity of a hard disk 7 and the head gimbal assembly 3 is loaded and unloaded between the ramp block 23 and the hard disk 7. The camera 101 monitors the load/unload movement of the head gimbal assembly 3.

FIGS. 8A to 8H are views illustrating the related art of FIG. 7, in which FIGS. 8A, 8C, 8E, and 8G illustrate the head gimbal assembly 3 observed with the camera 101 and FIGS. 8B, 8D, 8F, and 8H illustrate positions of the head gimbal assembly 3 with respect to the hard disk 7 and ramp block 23 in the situations of FIGS. 8A, 8C, 8E, and 8G; respectively. FIGS. 9A and 9B are views illustrating the embodiment of the present invention, in which FIG. 9A illustrates the head gimbal assembly observed with the second high-speed camera 29 of FIG. 4 and FIG. 9B illustrates the behavior of the head gimbal assembly 3.

Figure 8A:
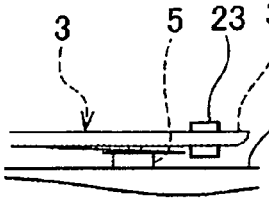
Figure 8B:
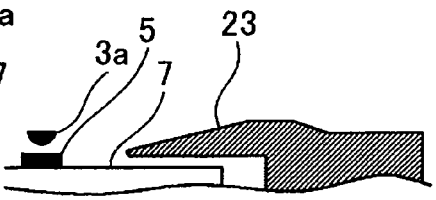
Figure 8C:
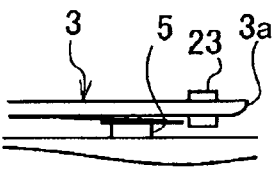
Figure 8D:
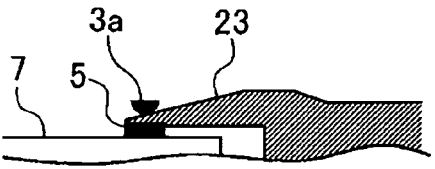
Figure 8E:
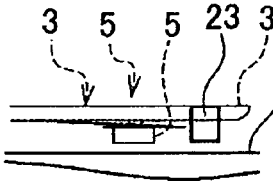
Figure 8F:
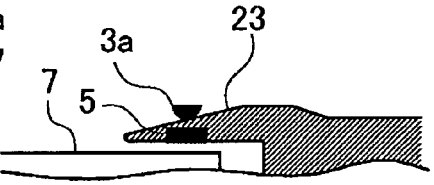
Figure 8G:
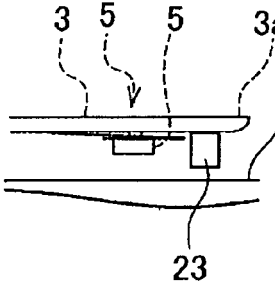
Figure 8H:
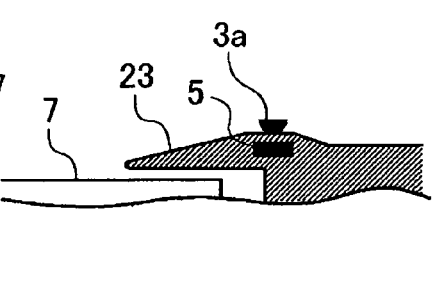
Figure 9A:
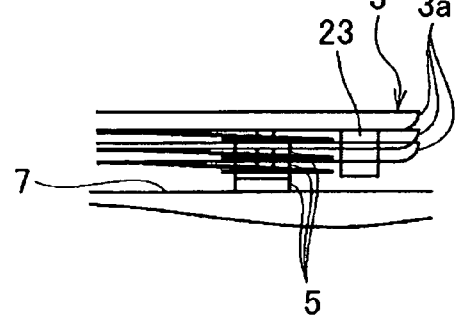
Figure 9B:
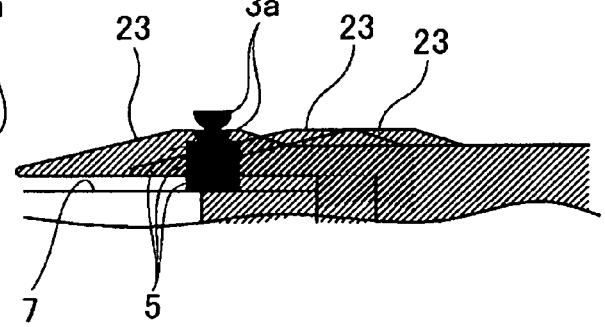

According to the related art of FIG. 7, the head gimbal assembly 3 and the slider 5 thereof at each of the turn positions illustrated in FIGS. 8B, 8F, and 8H are defocused in the camera 101 as illustrated in FIGS. 8A, 8E, and 8G. Only at the turn position illustrated in FIG. 8D, the related art can observe a focused image of the head gimbal assembly 3 as illustrated in FIG. 8C.

On the other hand, the embodiment of the present invention does not turn the head gimbal assembly 3 during the relative turn, and therefore, there is no change in a depth of field for the second high-speed camera 29 as illustrated in FIG. 9B. Accordingly, the embodiment is able to observe a focused image of the slider 5 of the head gimbal assembly 3 at every turn position as illustrated in FIG. 9A.

An observing direction of the head gimbal assembly 3 by a high-speed camera is not limited to the front or the side of the head gimbal assembly 3. Any observing direction is adoptable if it allows to obtain data on motion characteristics of the head gimbal assembly 3.

Figure 10:
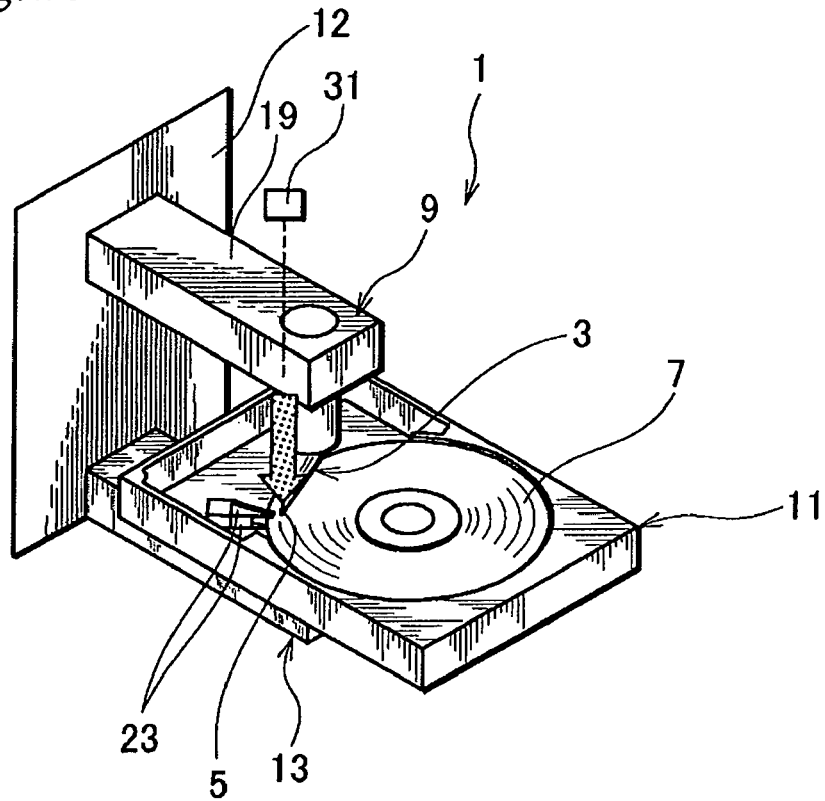
FIG. 10 is a perspective view illustrating the apparatus of FIG. 1 with a laser Doppler velocimeter.
Figure 11:
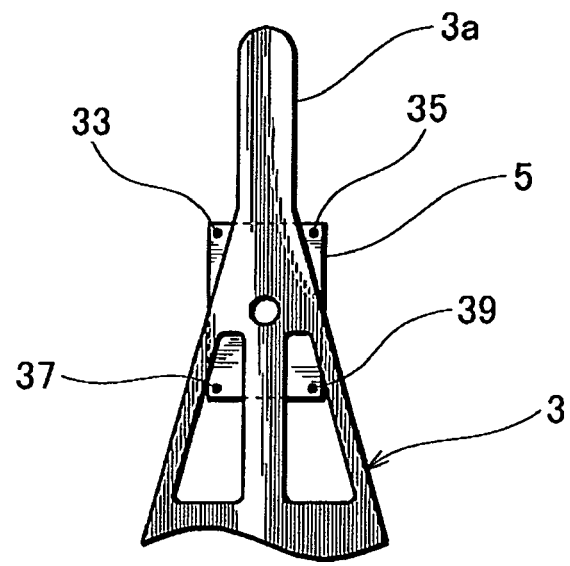
FIG. 11 is a plan view illustrating laser irradiating positions on a slider of a head suspension to be observed by the apparatus of FIG. 10.

FIG. 10 is a perspective view illustrating the apparatus 1 of FIG. 1 provided with a laser Doppler velocimeter 31 and FIG. 11 is a plan view illustrating laser irradiating positions on the slider 5 of the head gimbal assembly 3 to be observed with the apparatus 1 of FIG. 10.

In FIG. 10, the laser Doppler velocimeter 31 serving as a data monitor emits a laser beam to the slider 5 and receives a reflected beam from the slider 5. The emitted laser beam runs in parallel to a rotation axis around which the head gimbal assembly 3 is turned in actual use.

The laser Doppler velocimeter 31 emits a laser beam to each of four locations 33, 35, 37, and 39 on the slider 5 and receives each reflected beam from the slider 5, to thereby obtain data concerning the behavior of the slider 5.

The slider 5 of the head gimbal assembly 3 that receives a laser beam from the laser Doppler velocimeter 31 is fixed to the fixed shaft 15, although a relative turn is created between the head gimbal assembly 3 and the disk drive 11. Accordingly, the laser Doppler velocimeter 31 can easily and correctly emit a laser beam to the slider 5 and receive a reflected beam therefrom, to obtain data about motion characteristics of the head gimbal assembly 3.

The laser Doppler velocimeter 31 may be arranged to emit a laser beam to a side face or any other part of the slider 5.

Further, it may emit a laser beam to an element of the head gimbal assembly 3 other than the slider 5, to observe the behavior of the element.

In this way, the apparatus 1 of the above-mentioned embodiment for measuring motion characteristics the head gimbal assembly 3 exhibits when turned in a radial direction of the hard disk 7 includes the assembly support 9 configured to fixedly support the head gimbal assembly 3 on the center axis that corresponds to the rotation axis around which the head gimbal assembly 3 is turned in actual use; the disk drive 11 configured to rotatably support the hard disk 7 and turn around a turn axis that is concentric with the center axis on which the head gimbal assembly 3 is fixedly supported; and the turn unit 13 configured to turn the disk drive 11 around the turn axis, thereby creating a relative turn of the head gimbal assembly 3 with respect to the hard disk 7.

The apparatus 1 is capable of creating a situation of turning the head gimbal assembly 3 in a radial direction of the hard disk 7 without actually turning the head gimbal assembly 3 in the radial direction of the hard disk 7. Accordingly, the apparatus 1 is able to easily and correctly obtain data related to the motion characteristics the head gimbal assembly 3 including the slider 5, head suspension and the like exhibits when turned in the radial direction of the hard disk.

The apparatus 1 may employ the first and second high-speed cameras 27 and 29 to photograph the head gimbal assembly 3 and obtain data on the motion characteristics of the head gimbal assembly 3 including the slider 5, head suspension and the like. At this time, the apparatus 1 is able to obtain the data on the motion characteristics indicative of the behavior of the slider 5, head suspension and the like for the whole range of a turn of the head gimbal assembly 3. The apparatus 1 causes no change in a depth of field for the second camera 29. Accordingly, the second camera 29 is able to easily focus on the slider 5, to correctly obtain the data on the motion characteristics of the head gimbal assembly 3, in particular, the slider 5 thereof.

The apparatus 1 may employ the laser Doppler velocimeter 31 that emits a laser beam to the slider 5 of the head gimbal assembly 3. Although the head gimbal assembly 3 is fixed to the fixed shaft 15, the apparatus 1 creates a relative turn between the head gimbal assembly 3 and the hard disk 7. Accordingly, the laser Doppler velocimeter 31 is allowed to correctly emit a laser beam onto the slider 5 and receive a reflected beam therefrom, and therefore, the apparatus 1 can obtain correct data on the motion characteristics of the head gimbal assembly 3.

According to the embodiment, the disk drive 11 has the ramp block 23 adjacent to the periphery of the hard disk 7 and the tab 3a formed in the vicinity of the slider 5 of the head gimbal assembly 3 is guided along a slope of the ramp block 23 when the head gimbal assembly 3 is loaded onto and unloaded from the hard disk 7. Accordingly, data on motion characteristics the head gimbal assembly 3 including the slider 5, head suspension and the like exhibits when loaded onto or unloaded from the hard disk 7 is easily and correctly obtainable with the use of the first and second high-speed cameras 27, 29, the laser Doppler velocimeter 31, the torquemeter 17, and the like.

Another embodiment of the present invention is a method of measuring motion characteristics the head gimbal assembly 3 exhibits when turned in a radial direction of the hard disk 7. The method includes fixedly supporting the head gimbal assembly 3 on a center axis that corresponds to a rotation axis around which the head gimbal assembly 3 is turned in actual use; turning the disk drive 11 rotatably supporting the hard disk 7 around a turn axis that is concentric with the center axis on which the head gimbal assembly 3 is fixedly supported, thereby creating a relative turn of the head gimbal assembly 3 with respect to the hard disk 7; and obtaining data related to the motion characteristics of the head gimbal assembly 3.

The method is capable of creating a situation of turning the head gimbal assembly 3 in a radial direction of the hard disk 7 without actually turning the head gimbal assembly 3 in the radial direction of the hard disk 7. Accordingly, the method is able to easily and correctly obtain data related to motion characteristics the head gimbal assembly 3 including the slider 5, head suspension and the like exhibit when turned.

According to the method, the disk drive 11 has the ramp block 23 adjacent to the periphery of the hard disk 7 and the tab 3a formed in the vicinity of the slider 5 of the head gimbal assembly 3 is guided along a slope of the ramp block 23 when the head gimbal assembly 3 is loaded onto and unloaded from the hard disk 7. The method turns the disk drive 11 to create a relative movement of the head gimbal assembly 3 along the slope of the ramp block 23 and obtains data about the motion characteristics of the head gimbal assembly 3. The method may employ the first and second high-speed cameras 27, 29, the laser Doppler velocimeter 31, the torquemeter 17, and the like to easily and correctly obtain data on motion characteristics the head gimbal assembly 3 including the slider 5, head suspension and the like exhibits when loaded onto or unloaded from the hard disk 7.

What is claimed is:

1. An apparatus for measuring motion characteristics a head gimbal assembly exhibits when turned in a radial direction of a hard disk, comprising:
   an assembly support configured to fixedly support the head gimbal assembly on a center axis that corresponds to a rotation axis around which the head gimbal assembly is turned in actual use;
   a disk drive configured to rotatably support the hard disk and turn around a turn axis that is concentric with the center axis on which the head gimbal assembly is fixedly supported; and
   a turn unit configured to turn the disk drive around the turn axis, thereby creating a relative turn of the head gimbal assembly with respect to the hard disk.

2. The apparatus of claim 1, wherein:
   the disk drive includes a ramp block adjacent to the hard disk, the ramp block being configured to guide a slider side of the head gimbal assembly when the head gimbal assembly is loaded onto and unloaded from the hard disk.

3. The apparatus of claim 1, further comprising:
   a data monitor configured to obtain data on the motion characteristics of the head gimbal assembly.

4. The apparatus of claim 2, further comprising:
   a data monitor configured to obtain data on the motion characteristics of the head gimbal assembly.

5. The apparatus of claim 3, wherein:
   the data monitor includes at least one of a high-speed camera and a laser Doppler velocimeter, the high-speed camera being configured to photograph the head gimbal assembly in a direction orthogonal to the center axis, the laser Doppler velocimeter being configured to emit a laser beam to a slider of the head gimbal assembly in a direction parallel to the center axis and receive a reflected beam from the slider.

6. The apparatus of claim 4, wherein:
   the data monitor includes at least one of a high-speed camera and a laser Doppler velocimeter, the high-speed camera being configured to photograph the head gimbal assembly in a direction orthogonal to the center axis, the laser Doppler velocimeter being configured to emit a laser beam to a slider of the head gimbal assembly in a direction parallel to the center axis and receive a reflected beam from the slider.

7. The apparatus of claim 3, wherein:
   the data monitor includes a torquemeter attached to the assembly support and configured to measure torque around the center axis acting on the head gimbal assembly.

8. The apparatus of claim 4, wherein:
   the data monitor includes a torquemeter attached to the assembly support and configured to measure torque around the center axis acting on the head gimbal assembly.

9. A method of measuring motion characteristics a head gimbal assembly exhibits when turned in a radial direction of a hard disk, comprising:
   fixedly supporting the head gimbal assembly on a center axis that corresponds to a rotation axis around which the head gimbal assembly is turned in actual use;
   turning a disk drive rotatably supporting the hard disk around a turn axis concentric with the center axis on which the head gimbal assembly is fixedly supported, thereby creating a relative turn of the head gimbal assembly with respect to the hard disk; and
   obtaining data related to the motion characteristics of the head gimbal assembly.

10. The method of claim 9, wherein:
    the disk drive includes a ramp block adjacent to the hard disk, the ramp block being configured to guide a slider side of the head gimbal assembly when the head gimbal assembly is loaded onto and unloaded from the hard disk;
    turning the disk drive around the turn axis creates loading and unloading movements of the head gimbal assembly with respect to the ramp block; and
    obtaining data related to the motion characteristics of the head gimbal assembly obtains data related to the loading and unloading movements of the head gimbal assembly.

* * * * *